United States Patent
Williams et al.

(10) Patent No.: US 12,100,961 B2
(45) Date of Patent: Sep. 24, 2024

(54) NATURALLY LOAD BALANCED REDUNDANT POWER CONVERSION SYSTEM

(71) Applicant: SPOC AUTOMATION INC., Trussville, AL (US)

(72) Inventors: Andrew B. Williams, Pass Christian, MS (US); Edward J. Wilke, Santa Rosa Beach, FL (US)

(73) Assignee: SPOC AUTOMATION INC., Trussville, AL (US)

( * ) Notice: Subject to any disclaimer, the term of this patent is extended or adjusted under 35 U.S.C. 154(b) by 360 days.

(21) Appl. No.: 17/720,124

(22) Filed: Apr. 13, 2022

(65) Prior Publication Data
US 2022/0337068 A1     Oct. 20, 2022

Related U.S. Application Data

(60) Provisional application No. 63/175,374, filed on Apr. 15, 2021.

(51) Int. Cl.
*H02J 3/36* (2006.01)
*H02J 3/00* (2006.01)
(Continued)

(52) U.S. Cl.
CPC ............. *H02J 3/36* (2013.01); *H02J 3/001* (2020.01); *H02J 3/32* (2013.01); *H02J 3/381* (2013.01);
(Continued)

(58) Field of Classification Search
CPC .... H02J 3/001; H02J 3/32; H02J 3/381; H02J 3/46; H02J 2310/42; H02M 7/493; H02M 7/539; H02P 5/74
See application file for complete search history.

(56) References Cited

U.S. PATENT DOCUMENTS

| | | |
|---|---|---|
| 249,191 A | 11/1881 | Mallory |
| 598,424 A | 2/1898 | Kuss |

(Continued)

FOREIGN PATENT DOCUMENTS

| | | |
|---|---|---|
| EP | 0 730 333 A2 | 9/1996 |
| GB | 2 445 382 A | 7/2008 |

OTHER PUBLICATIONS

"Isolated vs Non-Isolated Power Converters | CUI Inc." CUI Inc, Dec. 3, 2019, www.cui.com/blog/isolated-vs-non-isolated-power-converters#:~:text=In%20short%2C%20an%20isolated%20power. (Year: 2019).*

(Continued)

*Primary Examiner* — Daniel Cavallari
(74) *Attorney, Agent, or Firm* — STAAS & HALSEY LLP

(57) ABSTRACT

A plurality of generators redundantly supply power to AC motors via a main DC bus system having a pair of buses, each of which is connected to each generator by an active front end (AFE) inverter containing an insulated-gate bipolar transistor. Isolated DC/AC inverters are connected to the pair of main buses in pairs, respectively. Each pair of the isolated DC/AC inverters is connected to one of the AC motors with a filter of capacitors and inductors between each inverter and the motor. The AFE inverters and isolated DC/AC inverters galvanically isolate the main buses and enable load sharing among the generators.

20 Claims, 2 Drawing Sheets

(51) Int. Cl.
*H02J 3/32* (2006.01)
*H02J 3/38* (2006.01)
*H02J 3/46* (2006.01)
*H02M 7/493* (2007.01)
*H02M 7/539* (2006.01)
*H02P 5/74* (2006.01)

(52) U.S. Cl.
CPC ............ *H02J 3/46* (2013.01); *H02M 7/493* (2013.01); *H02M 7/539* (2013.01); *H02P 5/74* (2013.01); *H02J 2310/42* (2020.01)

(56) References Cited

U.S. PATENT DOCUMENTS

| | | | |
|---|---|---|---|
| 873,818 | A | 12/1907 | Wilke |
| 3,127,865 | A | 4/1964 | Pleuger |
| 4,164,661 | A | 8/1979 | Hucker et al. |
| 4,661,714 | A | 4/1987 | Satterthwaite et al. |
| 6,188,139 | B1 | 2/2001 | Thaxton et al. |
| 7,544,108 | B2 | 6/2009 | Rzadki et al. |
| 7,980,905 | B2 | 7/2011 | Rembach et al. |
| 8,062,081 | B2 | 11/2011 | Barrett et al. |
| 8,159,082 | B2 | 4/2012 | Gemin et al. |
| 8,706,330 | B2 | 4/2014 | Caouette |
| 8,946,928 | B2 | 2/2015 | Boe |
| 9,148,080 | B2 | 9/2015 | Kumar |
| 9,154,067 | B2 | 10/2015 | Frampton et al. |
| 9,413,164 | B2 | 8/2016 | Hoeven |
| 9,550,556 | B2 | 1/2017 | Kennedy |
| 9,745,038 | B2 | 8/2017 | Lai et al. |
| 9,780,643 | B2 | 10/2017 | Dong et al. |
| 9,899,842 | B2 | 2/2018 | Shiota et al. |
| 9,941,772 | B2 | 4/2018 | Lewis |
| 10,020,652 | B2 | 7/2018 | Lewis, III |
| 10,541,536 | B2 | 1/2020 | Rowden |
| 10,734,930 | B2 | 8/2020 | Vänskä et al. |
| 10,770,895 | B2 | 9/2020 | Clarke et al. |
| 10,938,215 | B1 | 3/2021 | Rembach |
| 10,974,802 | B2 | 4/2021 | Gjerpe et al. |
| 2004/0102109 | A1 | 5/2004 | Cratty et al. |
| 2008/0143182 | A1 | 6/2008 | Raju |
| 2010/0283318 | A1 | 11/2010 | Crane et al. |
| 2015/0295403 | A1 | 10/2015 | Lewis, III |
| 2015/0326022 | A1 | 11/2015 | Baragona et al. |
| 2017/0101167 | A1 | 4/2017 | Howard et al. |
| 2017/0373502 | A1 | 12/2017 | Gjerpe et al. |
| 2020/0212669 | A1 | 7/2020 | Gritsch |
| 2021/0376602 | A1* | 12/2021 | Schulz ............... H02J 1/10 |

OTHER PUBLICATIONS

International Search Report and Written Opinion of the International Searching Authority dated Jul. 27, 2022 for International Application No. PCT/US22/24660.

International Preliminary Report on Patentability dated Oct. 27, 2023 for International Application No. PCT/US2022/024660.

European Office Action dated Nov. 22, 2023 for European Application No. 22788870.8.

Jeon et al., "A Study on Application of Electric Propulsion System using AFE Rectifier for Small Coastal Vessels", Journal of the Korean Society of Marine Environment & Safety, vol. 24, No. 3, pp. 373-380, May 31, 2018.

"Current Sharing in Power Arrays", Maxi, Mini, Micro Family DC-DC Converters and Configurable Power Supplies, Design Guide & Applications Manual, Jan. 2021, pp. 21-25.

Mutarraf et al., "Energy Storage Systems for Shipboard Microgrids—A Review", *Energies* 2018, vol. 11, 3492, pp. 1-32.

Reddy et al., "Investigations on Active front-end and Active Filter based LVAC Power Architectures of Diesel Electric Propulsion System for Diving Support Vessels", IECON 2016—42nd Annual Conference of the IEEE Industrial Electronics Society, 2016, pp. 4419-4422.

Jeon et al., "Large-Scale Electric Propulsion Systems in Ships Using an Active Front-End Rectifier", Journal of Marine Science and Engineering, 2019, vol. 7, No. 6: 168, pp. 1-24.

Witold Pawel Pawlus, "Design and Analysis of Electric Powertrains for Offshore Drilling Applications", Doctoral dissertation at University of Agder, 2016, 250 pages.

D. Kumar et al., "A Comprehensive Review of Maritime Microgrids: System Architectures, Energy Efficiency, Power Quality, and Regulations," in IEEE Access, vol. 7, pp. 67249-67277, 2019.

U. Javaid et al., "MVDC Marine Electrical Distribution: Are we ready?," IECON 2015—41st Annual Conference of the IEEE Industrial Electronics Society, Nov. 9-12, 2015, pp. 000823-000828.

* cited by examiner

NATURALLY LOAD BALANCED REDUNDANT POWER CONVERSION SYSTEM

CROSS-REFERENCE TO RELATED APPLICATIONS

This application claims priority to U.S. Provisional Application No. 63/175,374, filed Apr. 15, 2021, which is incorporated by reference herein in its entirety.

BACKGROUND

Described below is a power conversion system that may be used for propulsion of marine vessels, as well as in other applications in which power is automatically routed from redundant power supplies to multiple loads. Known systems utilize a ring bus or tie breakers to isolate circuits in the event of a short circuit failure. This is inefficient due to using AC network design as a basis for a DC network.

SUMMARY

An aspect of at least one of the embodiments described herein is to provide variable frequency operation of each generator or other power supply independently.

Another aspect of at least one of the embodiments is to provide balanced load sharing from both power generation and loads to balance power demand.

A further aspect of at least one of the embodiments is to deliver power from any generator or stored energy source to any load without either a tie breaker between the galvanically isolated bus systems or a ring bus connecting galvanically isolated bus systems.

Yet another aspect of at least one of the embodiments is to provide galvanically isolated DC bus systems that are load balanced by output inverters that actively synchronize their AC outputs with each other while maintaining galvanic isolation of the DC bus systems to which they are connected.

A further aspect of at least one of the embodiments is to share loads in parallel feeds by using inverters in a DC network to control the direction and amplitude of current and voltage.

Yet another aspect of at least one of the embodiments is to allow for an odd number of generators or battery banks to be installed on a vessel while still providing a balanced power system.

A further aspect of at least one of the embodiments is to provide cost-effective enhanced redundancy using dual power sources for critical loads.

A still further aspect of at least one of the embodiments is to allow two generators in variable frequency mode to be used in class 2 dynamic positioning systems rated DP 2 or DP-3 by the International Maritime Organization (IMO) without energy storage in a parallel galvanically isolated bus configuration; thereby providing potential fuel savings of up to 75% compared to four generators in 60 Hz fixed frequency mode by using fewer or smaller generators and/or smaller thrusters to obtain a desired vessel performance operating profile.

Yet another aspect of at least one of the embodiments is to eliminate reduce the risk of a zero voltage condition at the connected loads.

A still further aspect of at least one of the embodiments is to eliminate the need for live short circuit testing in closed bus configurations.

Yet another aspect of at least one of the embodiments is to provide soft failure in which a single bus failure or short circuit results in reduced power available to all loads, without zero voltage conditions at load. As a result, the worst case of a single-point failure of the power conversion system is the failure of a single motor or thruster.

A still further aspect of at least one of the embodiments is to provide selectable redundancy . . . . Each active front end (AFE) insulated-gate bipolar transistor inverter that feeds a bus and each inverter that feeds a motor can be sized to provide a desired amount of redundancy. For example each AFE inverter can be sized for 50%, 75% or 100% of the generator capacity, while each inverter can be sized for 50%, 75% or 100% of the motor load.

Yet another aspect of at least one of the embodiments is to provide significantly enhanced operational capabilities for marine vessels classed for dynamic positioning applications, e.g., IMO Class DP 2, etc.

BRIEF DESCRIPTION OF DRAWINGS

These and other aspects and advantages will become more apparent and more readily appreciated from the following description of the exemplary embodiments, taken in conjunction with the accompanying drawings of which.

DETAILED DESCRIPTION OF EMBODIMENTS

Reference will now be made in detail to embodiments, examples of which are illustrated in the accompanying drawings. In this regard, the embodiments may have different forms and should not be construed as being limited to the descriptions set forth herein. To further clearly describe features of the embodiments, descriptions of other features that are well known to one of ordinary skill in the art are omitted here.

The articles "a", "an" and "the" are intended to include both singular and plural forms of the following nouns. Phrases using the term "and/or" include a plurality of combinations of relevant items or any one item among a plurality of relevant items. The term "at least [number]" preceding a list of items denotes any combination of the items in the list that satisfies the expression. In the case of "at least one" the expression includes any one item among a plurality of the listed item(s), as well as multiple items. Expressions such as "at least one of," when preceding a list of elements, modify the entire list of elements and do not modify the individual elements of the list.

In the embodiment illustrated in FIG. 1, generators G1 to G4 may produce AC power at 480V, 690V or higher. Isolated power source inverters 10, e.g., AFE inverters, convert the AC output of generators G1 to G4 to DC and galvanically isolate at least two 1000 VDC class main (primary) bus systems BUS 1A, BUS 1B. Each generator is connected to at least two of the isolated AFE inverters 10. The AFE inverters 10 on BUS 1A load share with all active inverters 10 on BUS 1A via adjustable settings within the inverter (DC Bus Voltage Reference, Droop %). The AFE inverters 10 on BUS 1B load share with all active inverters 10 on BUS 1B via adjustable settings within the inverter (DC Bus Voltage Reference, Droop %). Each AFE 10 that feeds a bus can be sized to provide the desired amount of redundancy. For example, each AFE 10 can be sized up to 100%+ of the generator's capacity.

The AFE inverters 10 allow generators G1 to G4 to load share while being galvanically isolated from each other, without synchronization. The AFE inverters 10 eliminate harmonics, correct power factor to near 1.0, boost the AC voltage from generators G1 to G4 when converted to DC and precisely control the DC bus voltage of main bus systems BUS 1A, BUS 1B. The AFE inverters 10 are capable of balanced load sharing independently without communicating with each other via adjustable settings within the inverter (DC Bus Voltage Reference, Droop %), thus providing a naturally load balanced power conversion system.

Figure 1A:
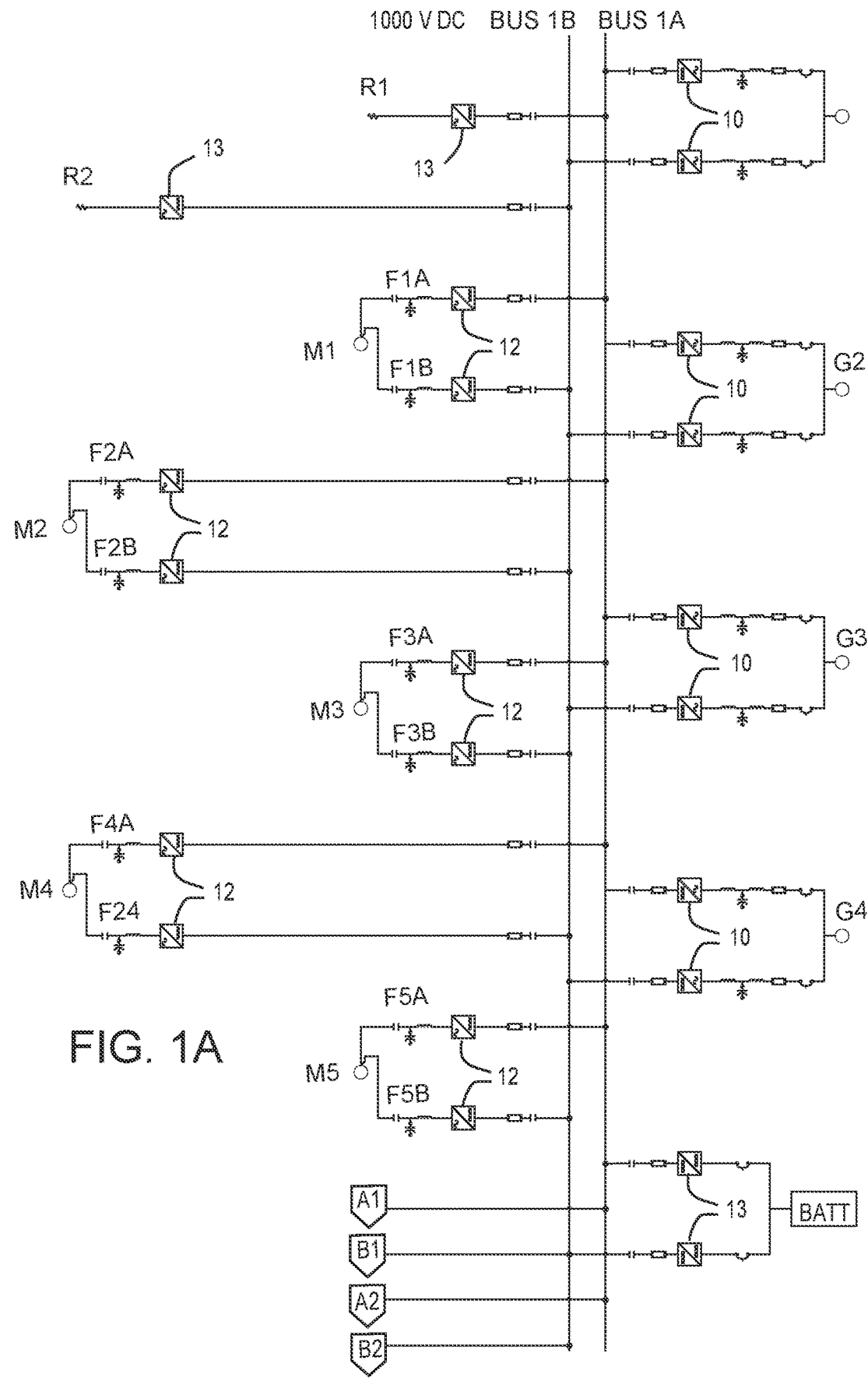
FIGS. 1A-1B are a circuit diagram of an embodiment of a naturally load balanced redundant power conversion system.

As illustrated in FIG. 1A, energy storage system(s) BATT are each connected to main bus systems Bus 1A, Bus 1B via multiple DC/DC converters 11. The energy storage system(s) BATT may be charged by any of generators G1 to G4 and supply power to main bus systems BUS 1A, BUS 1B when loads exceed running generator capacity or when none of generators G1 to G4 are in operation.

In the embodiment illustrated in FIG. 1A, main drive motors M1 to M5 are supplied with power from main bus systems BUS 1A, BUS 1B. For example, main drive motors M1 and M5 may be port and starboard drives drawing 1850 KW each, while main drive motors M2 to M4 may be bow thrusters drawing 1050 KW each. Each of the main drive motors M1 to M5 may be fed by a pair of isolated parallel DC/AC inverters 12 with a master controller (not shown) for each pair. One of the pair of inverters 12 for each motor is fed from BUS 1A and the other inverter 12 is fed from BUS 1B. Inverters 12 are connected to motors M1 to M5 via inductor/capacitor filters F1A to F5B. Load sharing between the inverters 12 is controlled by inverter software that communicates with the inverters 12 via a fiber optic cable (not shown). Inverters 12 actively synchronize their AC outputs which are tied together to redundantly feed a single load while maintaining galvanic isolation of the separate DC bus systems BUS 1A, BUS 1B. If one inverter 12 goes down, the other inverter 12 can remain active if the master controller is operational. Each inverter 12 can be sized for up to 100%+ of the motor load. One 50% inverter is capable of spinning a thruster driven by a motor to approximately 65-70% of maximum speed.

In addition, overvoltage conditions on main bus systems BUS 1A, BUS 1B may be controlled or mitigated by brake resistors R1, R2, connected to main bus systems BUS 1A, BUS 1B, respectively, via brake choppers 13.

Figure 1B:
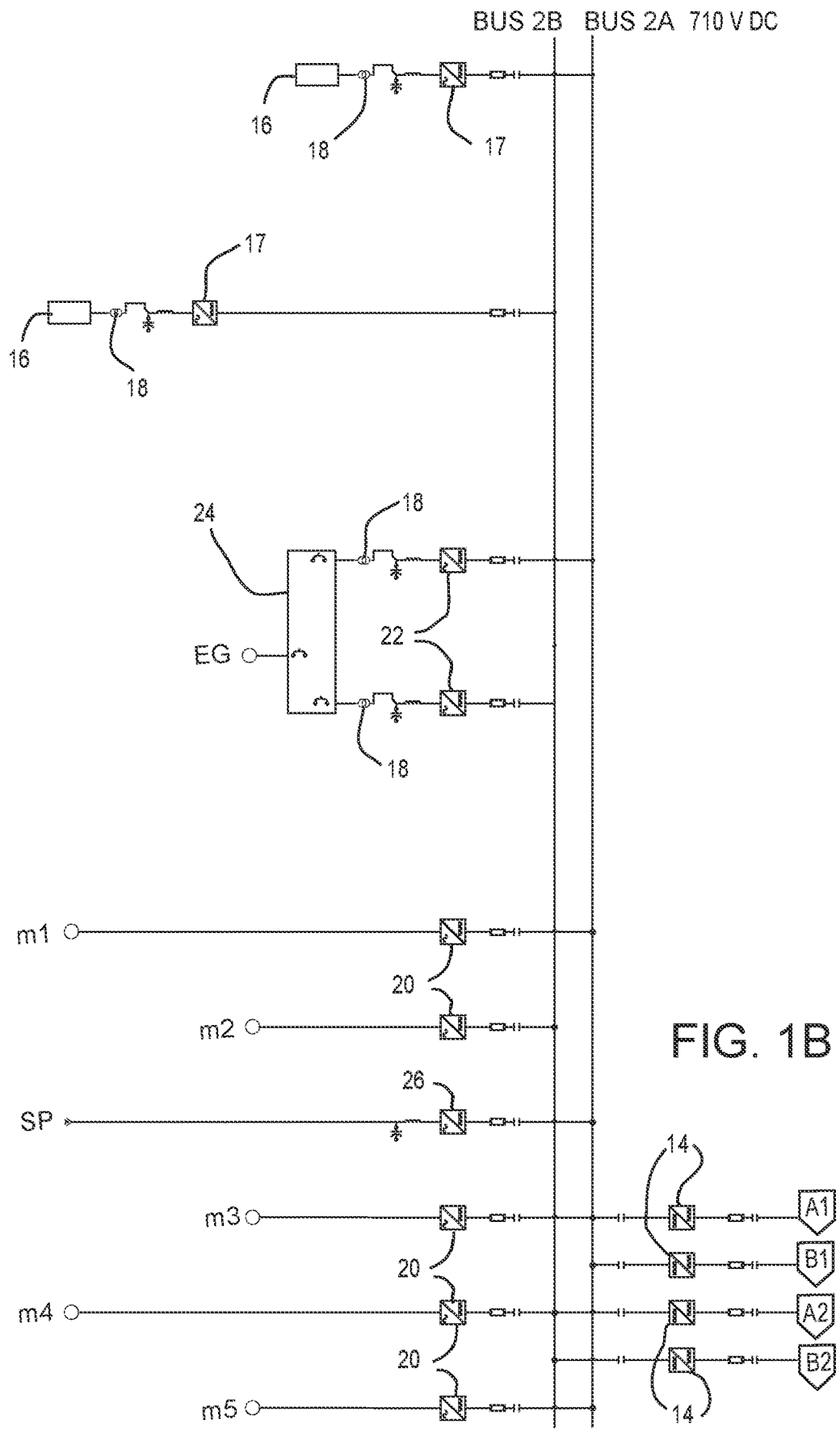

As indicated by the off-page connectors A1, B1, A2, B2 on FIGS. 1A and 1B, in the embodiment illustrated in FIGS. 1A and 1B, the 1000 VDC Bus System BUS 1A, BUS 1B is connected to a secondary 710 VDC bus system BUS 2A, BUS 2B. Although only one secondary bus system is illustrated in FIG. 1B, there may be two or more 710 VDC bus systems. Each 710 VDC bus system BUS 2A, BUS 2B is dual fed from the 1000 VDC bus system BUS 1A, BUS 1B by a pair of DC/DC converters 14 that load share to make sure that 710 VDC Bus 2A is equally sourced from 1000 VDC bus system BUS 1A, BUS 1B and that the 710 VDC BUS 2B is equally sourced from the 1000 VDC bus system BUS 1A, BUS 1B. 710 VDC bus system BUS 2A, BUS 2B is isolated from 1000 VDC bus system BUS 1A, BUS 1B by DC/DC converters 14. As a result 1000 VDC bus system BUS 1A, BUS 1B can be completely isolated while the vessel is on shore power for maintenance of 1000 VDC bus system BUS 1A, BUS 1B.

In the embodiment illustrated in FIG. 1B, hotel loads and smaller motors are supplied with power from 710 VDC bus system BUS 2A, BUS 2B. A pair of 480 VAC load centers 16, each fed by a grid inverter 17 via a 480V input/480V output isolation transformer 18, provide for nonessential non-motor loads. The 480V input/480V output isolation transformer prevents common mode voltages from occurring. Individual non-essential motors m1 to m5 are supplied with power from the 710 VDC bus system BUS 2A, BUS 2B by variable frequency drive controllers 20.

A pair of 480 VAC grid inverters 22, one from BUS 2A and the other from BUS 2B provide a parallel and redundant source of power for emergency panel 24. This allows for hot sync to and from emergency generator EG when normal and emergency power are available.

A shore power inverter 26 is connected to 710 VDC BUS 2A allowing for hot sync to and from shore power SR One of the grid inverters 22 connected to emergency panel EP can be used to safely back feed 710 VDC BUS 2B when 710 VDC BUS 2A is connected to shore power SP.

The embodiment described above provides all of the following benefits simultaneously:
(1) galvanically isolated variable frequency operation of all generators;
(2) balanced load sharing between galvanically isolated redundant DC bus systems;
(3) enhanced redundancy without the use of tie breakers or a ring bus system;
(4) differentiated worst case single point failure analysis with no zero voltage conditions;
(5) ability to balance loads with odd numbers of generators or battery systems and load share with multiple different sized generators;
(6) a self-healing system in which failure is isolated to the part of the system that fails; and
(7) seamless closed transition to and from shore power.

For example, the naturally load balanced DC buses BUS 1A, BUS 1B have several advantages over the power distribution system illustrated in FIG. 2 of U.S. Pat. No. 8,946,928. This known system has four generators, each generator connected via dual thyristor rectifiers to two DC distribution buses. Four AC motors are powered by the distribution system illustrated in FIG. 2 of the '928 patent with two AC motors connected to each bus via DC/AC inverters. As a result, a single bus failure results in loss of power to half of the four motors. In other words, while there is redundant power generation, the distribution system illustrated in FIG. 2 of the '928 patent is not load balanced or fault redundant. Thus, a single power bus failure in the system described above continues to supply power to all motors, possibly reduced depending on the capacity of the inverters, unlike the distribution system illustrated in FIG. 2 of the '928 patent.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An electrical power conversion system receiving alternating current power from power sources and supplying alternating current power to primary loads, comprising:
   isolated power source inverters, each power source connected to a pair of the isolated power source inverters;
   a pair of primary direct current buses, galvanically isolated from each other, each primary direct current bus connected to a different inverter in the pair of the isolated power source inverters connected to each power source; and isolated parallel DC/AC inverters, connected to the pair of primary direct current buses in pairs, respectively, each pair of the isolated parallel DC/AC inverters connected to one of the primary loads, converting direct current power to alternating current power supplied to the primary loads.

2. The electrical power conversion system according to claim 1, wherein each of the isolated power source inverters includes an active front end insulated-gate bipolar transistor.

3. The electrical power conversion system according to claim 2, further comprising filters, including capacitors and inductors, respectively connected between each of the primary loads and the pair of the isolated parallel DC/AC inverters connected thereto.

4. The electrical power conversion system according to claim 3, wherein secondary loads are connected to the electrical power conversion system, further comprising:
pairs of isolating DC/DC inverters, each pair of the isolating DC/DC inverters correspondingly connected to the pair of primary direct current buses;
a pair of secondary direct current buses, each of the secondary direct current buses connected to one of the pairs of the isolating DC/DC inverters, and
secondary DC/AC inverters, each connected between one of the pair of secondary direct current buses and one of the secondary loads.

5. The electrical power conversion system according to claim 4, wherein an emergency generator is connected to the electrical power conversion system,
wherein the secondary DC/AC inverters include a pair of grid inverters correspondingly connected to the pair of secondary direct current buses,
further comprising:
an emergency panel connected to the emergency generator; and
a pair of transformers correspondingly connected to the pair of grid inverters and both of the transformers connected to the emergency panel.

6. The electrical power conversion system according to claim 5, wherein the electrical power conversion system is on a marine vessel that can receive power from shore, further comprising
a shore power connector; and
a shore power inverter connected between the shore power connector and one of secondary direct current buses,
wherein one of the grid inverters supplies the emergency panel with power from the one of secondary direct current buses when the shore power connector receives power from shore.

7. The electrical power conversion system according to claim 4, wherein the secondary loads include non-essential motors, and
wherein the secondary DC/AC inverters include variable frequency drive controllers, each controlling one of the non-essential motors.

8. The electrical power conversion system according to claim 3, wherein the power sources include generators of different sizes.

9. The electrical power conversion system according to claim 3, wherein the power sources include an odd number of generators.

10. The electrical power conversion system according to claim 3, wherein the power sources include at least one battery system.

11. The electrical power conversion system according to claim 1, further comprising filters, including capacitors and inductors, respectively connected between each of the primary loads and the pair of the isolated parallel DC/AC inverters connected thereto.

12. The electrical power conversion system according to claim 11, wherein the power sources include generators of different sizes.

13. The electrical power conversion system according to claim 11, wherein the power sources include an odd number of generators.

14. The electrical power conversion system according to claim 11, wherein the power sources include at least one battery system.

15. The electrical power conversion system according to claim 1, wherein secondary loads are connected to the electrical power conversion system, further comprising:
pairs of isolating DC/DC inverters, each pair of the isolating DC/DC inverters correspondingly connected to the pair of primary direct current buses;
a pair of secondary direct current buses, each of the secondary direct current buses connected to one of the pairs of the isolating DC/DC inverters, and
secondary DC/AC inverters, each connected between one of the pair of secondary direct current buses and one of the secondary loads.

16. The electrical power conversion system according to claim 15, wherein an emergency generator is connected to the electrical power conversion system,
wherein the secondary DC/AC inverters include a pair of grid inverters correspondingly connected to the pair of secondary direct current buses,
further comprising:
an emergency panel connected to the emergency generator; and
a pair of transformers correspondingly connected to the pair of grid inverters and both of the transformers connected to the emergency panel.

17. The electrical power conversion system according to claim 16, wherein the electrical power conversion system is on a marine vessel that can receive power from shore, further comprising
a shore power connector; and
a shore power inverter connected between the shore power connector and one of secondary direct current buses,
wherein one of the grid inverters supplies the emergency panel with power from the one of secondary direct current buses when the shore power connector receives power from shore.

18. The electrical power conversion system according to claim 15, wherein the secondary loads include non-essential motors, and
wherein the secondary DC/AC inverters include variable frequency drive controllers, each controlling one of the non-essential motors.

19. The electrical power conversion system according to claim 1, wherein the power sources include generators of different sizes.

20. The electrical power conversion system according to claim 1, wherein the power sources include an odd number of generators.

* * * * *